United States Patent
Okuyama et al.

(10) Patent No.: US 8,957,980 B2
(45) Date of Patent: Feb. 17, 2015

(54) IMAGE PICKUP APPARATUS

(71) Applicant: Canon Kabushiki Kaisha, Tokyo (JP)

(72) Inventors: Atsushi Okuyama, Tokorozawa (JP);
Takuji Umezu, Yokohama (JP)

(73) Assignee: Canon Kabushiki Kaisha (JP)

( * ) Notice: Subject to any disclaimer, the term of this patent is extended or adjusted under 35 U.S.C. 154(b) by 175 days.

(21) Appl. No.: 13/768,084

(22) Filed: Feb. 15, 2013

(65) Prior Publication Data

US 2013/0215285 A1 Aug. 22, 2013

(30) Foreign Application Priority Data

Feb. 20, 2012 (JP) .................. 2012-033496

(51) Int. Cl.
 *H04N 5/225* (2006.01)
 *H04N 5/232* (2006.01)
(52) U.S. Cl.
 CPC ......... *H04N 5/23245* (2013.01); *H04N 5/2254* (2013.01)
 USPC ......... 348/220.1; 348/323; 348/340; 348/367
(58) Field of Classification Search
 CPC ................................ H04N 5/23245
 USPC .......... 348/220.1, 221.1, 296, 319, 320, 321, 348/322, 323, 335, 340, 362, 363, 367
 See application file for complete search history.

(56) References Cited

U.S. PATENT DOCUMENTS

| | | | | |
|---|---|---|---|---|
| 4,410,804 A | * | 10/1983 | Stauffer | 250/208.2 |
| 7,903,162 B2 | * | 3/2011 | Juen | 348/333.01 |
| 2003/0095191 A1 | * | 5/2003 | Saito | 348/220.1 |
| 2006/0221204 A1 | * | 10/2006 | Ogawa | 348/223.1 |
| 2007/0014019 A1 | * | 1/2007 | Mouli | 359/619 |
| 2008/0291311 A1 | * | 11/2008 | Kusaka | 348/308 |
| 2009/0316033 A1 | | 12/2009 | Uchida | |

FOREIGN PATENT DOCUMENTS

| | | |
|---|---|---|
| JP | 10319310 A | 12/1998 |
| JP | 2007-134806 A | 5/2007 |
| JP | 2010-004175 A | 1/2010 |

* cited by examiner

*Primary Examiner* — Aung S Moe
*Assistant Examiner* — Chriss Yoder, III
(74) *Attorney, Agent, or Firm* — Rossi, Kimms & McDowell LLP (57) ABSTRACT

An image pickup apparatus includes an image sensor that includes a plurality of first photoelectric conversion elements, and a plurality of second photoelectric conversion elements, a plurality of micro lenses each of which is provided for each pixel on the image sensor, and a controller configured to execute still image pickup using the plurality of second photoelectric conversion elements simultaneous with motion image pickup using the plurality of first photoelectric conversion elements. Each micro lens introduces a light flux from part of an exit pupil of the image pickup optical system to at least one first photoelectric conversion element, and a light flux from another part of the exit pupil to at least one second photoelectric conversion element.

9 Claims, 8 Drawing Sheets

IMAGE PICKUP APPARATUS

BACKGROUND OF THE INVENTION

1. Field of the Invention

The present invention relates to an image pickup apparatus configured to capture a motion image and a still image.

2. Description of the Related Art

It is conventionally known to capture a still image while a motion image is being captured (Japanese Patent Laid-Open No. ("JP") 2010-4175), and an image sensor that includes a motion-image capturing pixel and a still-image capturing pixel is also known (JP 2007-134806). A so-called pupil splitting technology configured to provide two apertures near a diaphragm for a lens and to alternately shield light fluxes passing these apertures is also known (JP 10-319310).

As disclosed in JP 2007-134806, in capturing a still image using the still-image capturing pixel in the image sensor while the motion image is being taken without interrupting the motion image pickup, the resolution of the motion image lowers by an amount corresponding to the number of still-image capturing pixels.

SUMMARY OF THE INVENTION

The present invention provides an image pickup apparatus configured to capture a still image while a motion image is being captured and the resolution of the motion image is maintained.

An image pickup apparatus according to the present invention includes an image sensor that includes a plurality of first photoelectric conversion elements, and a plurality of second photoelectric conversion elements, a plurality of micro lenses each of which is provided for each pixel on the image sensor, and a controller configured to execute still image pickup using the plurality of second photoelectric conversion elements simultaneous with motion image pickup using the plurality of first photoelectric conversion elements. Each micro lens introduces a light flux from part of an exit pupil of the image pickup optical system to at least one first photoelectric conversion element, and a light flux from another part of the exit pupil to at least one second photoelectric conversion element.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
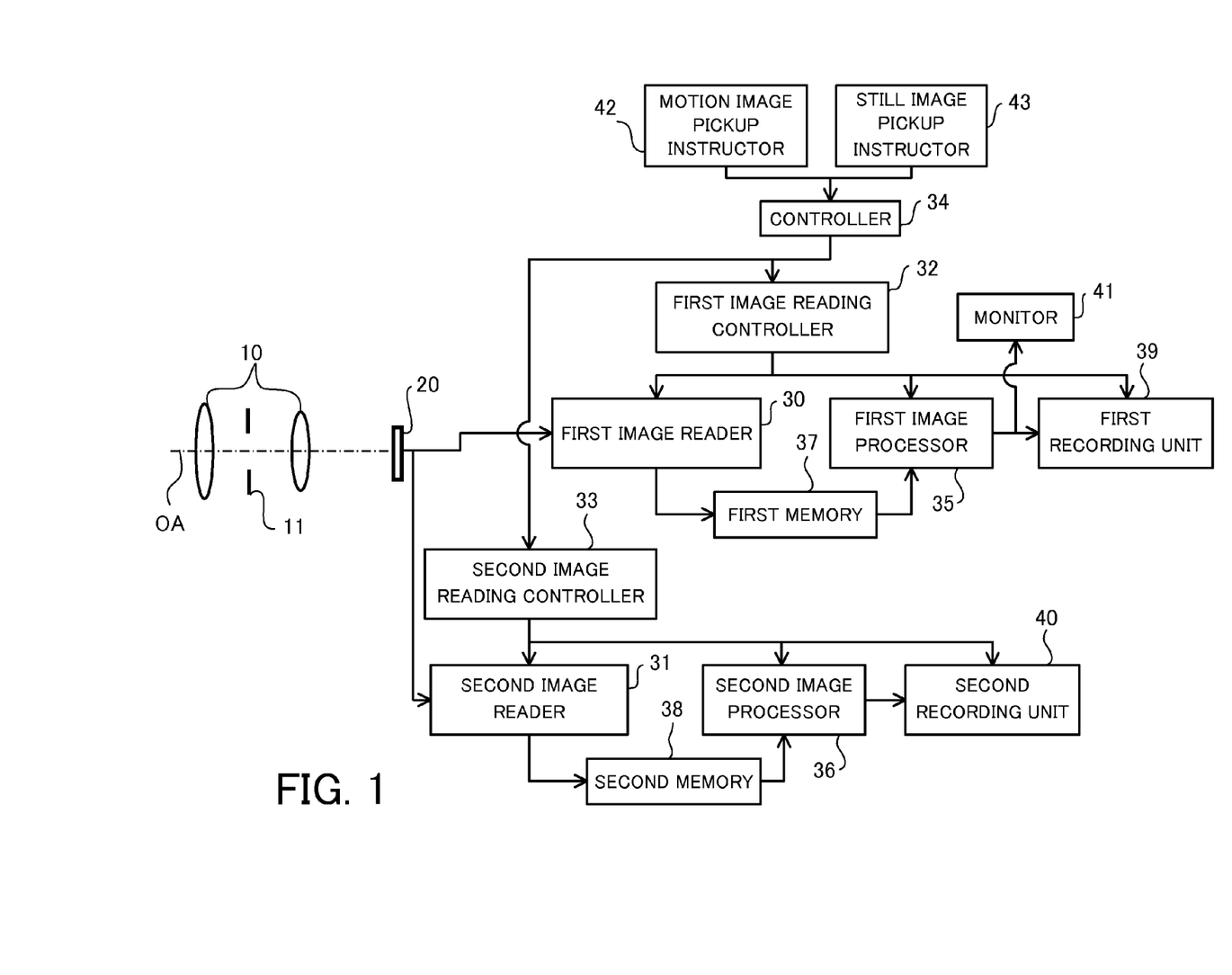
FIG. 1 is a block diagram of an image pickup apparatus according to a first embodiment of the present invention.

FIG. 1 is a block diagram of an image pickup apparatus according to the first embodiment. The image pickup apparatus, such as a digital still camera and a digital video camera, is configured to capture a motion image and a still image.

The image pickup apparatus includes an image pickup optical system 10 that includes a plurality of lens units and forms an optical image of an object, an image sensor 20, such as a CCD image sensor and a CMOS image sensor, configured to photoelectrically convert an optical image, and a control system. In FIG. 1, an alternate long and short dash line OA denotes an optical axis of the image pickup optical system 10. Reference numeral 11 denotes an aperture diaphragm configured to adjust a light quantity incident upon the image sensor 20. The plurality of lens units provided in the image pickup optical system 10 include a focus lens that is moved in the direction of the optical axis OA and provides focusing, and a zoom lens (magnification varying lens) that is moved in the optical axis direction and changes a focal length. The image pickup optical system 10 is housed in a lens barrel, and the lens barrel may be integrated with or detachably attached to the camera body.

Figure 2A:
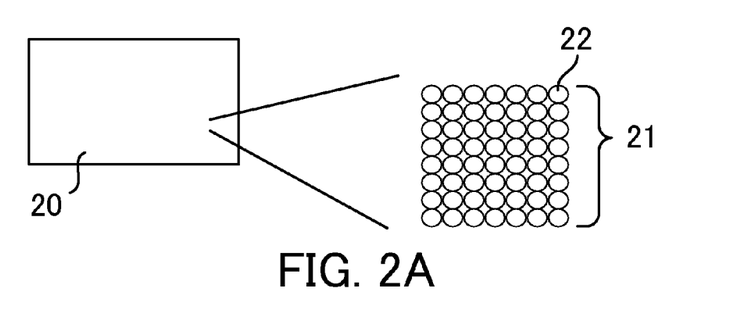
FIGS. 2A, 2B, and 2C are enlarged plane views of the image sensor illustrated in FIG. 1 according to first, second, and third embodiments.

FIG. 2A is an enlarged plane view of the image sensor 20 that has a micro lens array 21 in which a plurality of micro lenses 22 are arranged in an array shape. Each micro lens 22 is provided for each one pixel of the image sensor 20, and corresponds to one pixel. A plurality of light receiving elements corresponding to each micro lens receive light that passes that micro lens 22. The plurality of light receiving elements contain a light receiving element for a motion image and a light receiving element for a still image. Thus, in this embodiment, light of information of all image pickup pixels is received by the light receiving pixels that are divided into motion image capturing pixels and still image capturing pixels.

Each micro lens 22 maintains the light receiving element and the exit pupil to optically conjugate with each other and sustains the imaging state. Each light receiving element is a photoelectric conversion element configured to photoelectrically convert incident light. Color filters (not illustrated) are arranged on each pixel, for example, in a Bayer arrangement, and an image is formed for each line in the horizontal direction of FIG. 2A, based upon brightness information of a complementary color of each pixel.

Figure 2B:
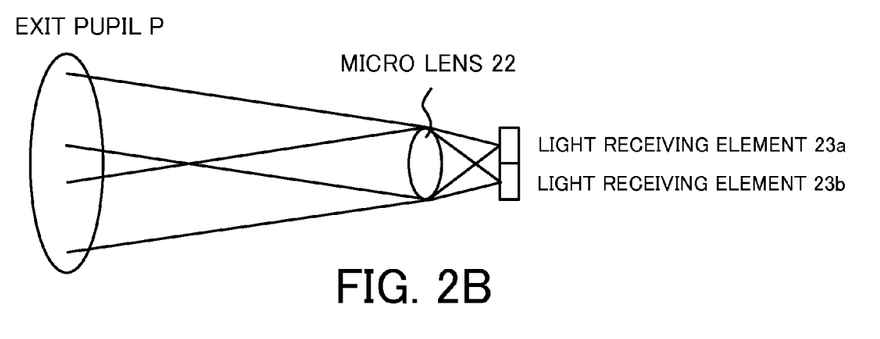

FIG. 2B illustrates that the exit pupil P is split by the micro lens 22 and the split light fluxes are led to two light receiving elements 23a and 23b. Thus, each micro lens 22 serves as a pupil splitter configured to lead a light flux from part of the exit pupil P of the image pickup optical system 10 to the light receiving element (first photoelectric conversion element) 23a and a light flux from another part of the exit pupil P of the image pickup optical system 10 to the light receiving element (second photoelectric conversion element) 23b. The number light receiving elements is illustrative only, as described later, and it may be sufficient that the light receiving elements to which each micro lens 22 leads light contains at least one light receiving element for a motion image and at least one light receiving element for a still image.

Figure 2C:
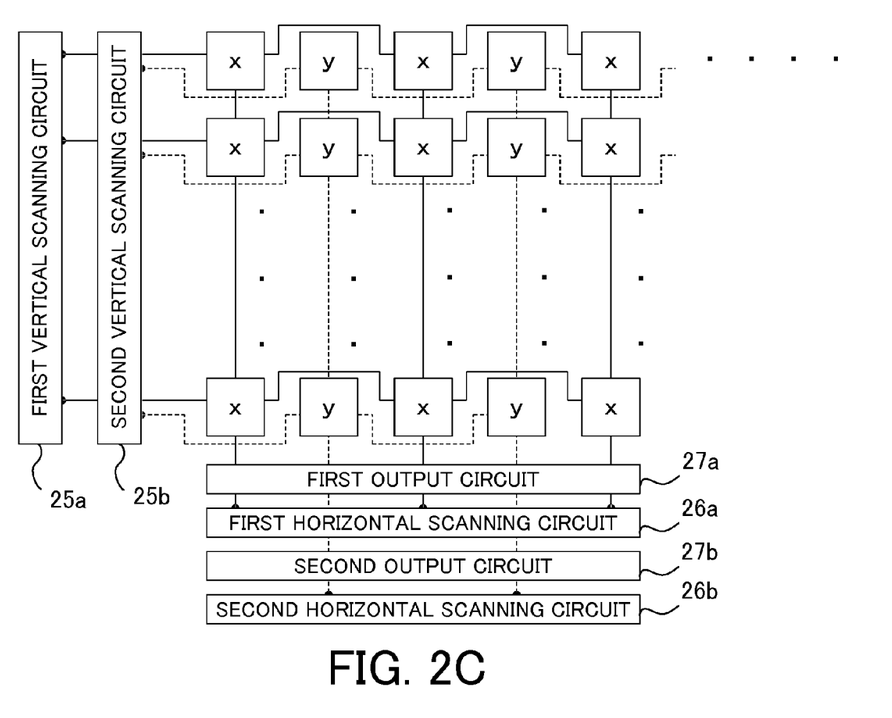

FIG. 2C is a block diagram of a structure of the image sensor 20. The light receiving element contains a light receiving element x used to capture a motion image and a light receiving element y used to capture a still image. The light receiving element x corresponds to the light receiving element 23a, and the light receiving element y corresponds to the light receiving element 23b. The micro lens 22 illustrated in FIG. 2B is arranged on a pair of neighboring light receiving elements x and y. Electric changes generated by the light receiving element x are output to a first output circuit 27a by a first vertical scanning circuit 25a and a first horizontal scanning circuit 26a. Electric changes generated by the light receiving element y are output to a second output circuit 27b by a second vertical scanning circuit 25b and a second horizontal scanning circuit 26b. The timings of scanning and outputting of each circuit illustrated in FIG. 2C are controlled by first and second image reader controllers 32 and 33.

The image sensor illustrated in FIG. 2C has an electronic shutter function (still image shutter unit) configured to output the stored electric charges in synchronization with a pulsed signal output from a timing generator (not illustrated). The output timing is a reading time period set by the second image reader 31. A high-speed shutter is produced by shortening the reading time period from the image sensor 20. The still image shutter driver is contained in the second image reading controller 33, and controls the reading time period (photoelectric conversion time period) from the still-image capturing light receiving element by the still image shutter unit.

Figure 3A:
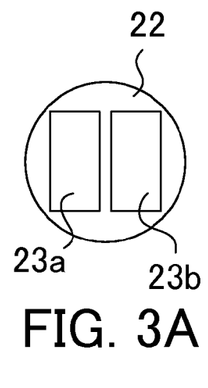
FIGS. 3A, 3B, and 3C are enlarged plane views each of which illustrates a relationship between a micro lens and light receiving elements illustrated in FIGS. 2A-2C according to the first, second, and third embodiments.
Figure 3B:
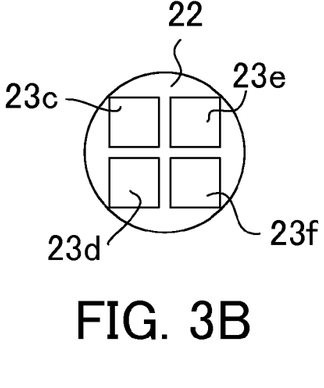
Figure 3C:
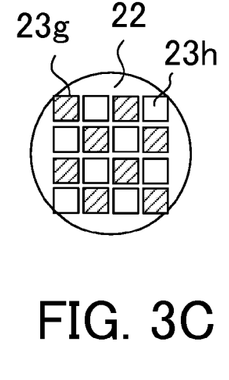

FIGS. 3A, 3B, and 3C are plane views of examples of a plurality of light receiving elements arranged for each micro lens 22.

FIG. 3A is an enlarged plane view of an arrangement according to this embodiment in which two light receiving elements 23a and 23b are arranged for each micro lens 22. FIG. 3A corresponds to FIGS. 2B and 2C. Each light receiving element is maintained approximately conjugate with the exit pupil of the image pickup optical system by the micro lens 22. The light receiving element 23a receives light from part of the exit pupil and uses the light to capture a motion image. The light receiving element 23b receives light from another part of the exit pupil and uses the light to capture a still image. In the configuration illustrated in FIG. 3A, the micro lens 22 corresponds to one pixel, and the light receiving elements 23a and 23b divide and obtain information of the one pixel. Therefore, the resolution does not lower because the number of pixels is not reduced.

When the exit pupil of the image pickup optical system 10 is located at an infinitely distant position, the center between the two light receiving elements 23a and 23b may be arranged on the optical axis of the micro lens 22. When the exit pupil of the image pickup optical system 10 is located at a finitely distant position, the center of the light receiving elements is offset from the optical axis of the micro lens 22 so that the light receiving element can be conjugate with the pupil of the image pickup optical system 10 and the two light receiving elements can equally receive the light.

FIG. 3B is an enlarged plane view when two by two (or four) light receiving elements 23c to 23f are arranged for each micro lens 22. This configuration enables the light quantity used to obtain a motion image to differ from the light quantity used to obtain a still image.

This embodiment obtains motion image information from the two light receiving elements 23c and 23d and still image information from the two light receiving elements 23e and 23f but two diagonal light receiving elements may be paired. Even in the configuration of FIG. 3B, each micro lens 22 corresponds to one pixel and the light receiving elements 23c to 23f divide and obtain information of one pixel. Hence, the resolution does not lower.

FIG. 3C is an enlarged plane view when four by four (or sixteen) light receiving elements 23 are arranged for each micro lens 22. When pixels used to obtain a motion image and pixels used to obtain a still image are arranged like a checked pattern, an image can be obtained in which a light quantity of the motion image is more precisely equal to a light quantity of the still image. Even in the configuration illustrated in FIG. 3C, each micro lens 22 corresponds to one pixel and the light receiving elements 23g and 23h divide and obtain information of one pixel. Hence, the resolution does not lower. The plurality of hatched light receiving elements 23g are used to capture a motion image, and the plurality of light receiving elements 23h are used to capture a still image.

The control system includes a first image reader 30, a second image reader 31, a first image reading controller 32, a second image reading controller 33, a controller 34, a first image processor 35, a second image processor 36, a first memory 37, a second memory 38, a first recording unit 39, a second recording unit 40, and a monitor 41. The first and second image readers 30, 31, the first and second image reading controllers 32, 33, the controller 34, and the first and second image processors 35, 36 may be formed as electric circuits, and a plurality of units may be integrated into one electric circuit.

The image pickup apparatus further includes a motion image pickup instructor 42 and a still image pickup instructor 43. The structures of the motion image pickup instructor 42 and still image pickup instructor 43 are not limited, and they may be formed as an electronic unit (touch sensor provided on a screen of the monitor 41) and a mechanical unit, such as a switch and a dial. Instructions of starting and stopping motion image pickup are input into the motion image pickup instructor 42 by a photographer. An instruction of still image pickup is input into the still image pickup instructor 43 by the photographer.

The image pickup optical apparatus can set a variety of image pickup modes. These image pickup modes include a first image pickup mode by which the photographer can capture a motion image, a second image mode by which the photographer can capture a still image, and a third image pickup mode by which the photographer can take a still image while a motion image is being taken. The following description mainly focuses on the third image pickup mode that is characteristic in this embodiment.

In the third image pickup mode, the motion image pickup starts in response to the instruction of the motion image pickup from the motion image pickup instructor 42, and the still image is taken without interrupting the motion image pickup in response to an instruction of the still image pickup from the still image pickup instructor 43.

The first and second image reader 30, 31 receive signals made by digitalizing the output of the image sensor 20 by the A/D converter (not illustrated). The first image reader 30 reads the motion image, and the second image reader 31 reads the still image.

The controller 34 controls an operation of the entire control system, and is comprised by a micro computer. The controller 34 executes still image pickup using the light receiving elements for the still image while the motion image is being captured using the light receiving elements for the motion image. The first image reading controller 32 displays a motion image on the monitor 41, and the controller 34 temporarily displays a still image on the monitor 41 when the still image is captured.

The controller 34 controls reading of the motion image by the first image reader 30 via the first image reading controller 32 in response to the instruction of a motion image pickup from the motion image pickup instructor 42, and controls image processing by the first image processor 35. The first image reading controller 32 controls recording of an image by the first recording unit 39.

The controller 34 controls reading of a still image by the second image reader 31 via the second image reading controller 33 in response to a still image pickup instruction from the still image pickup instructor 43, and controls image processing by the second image processor 36. The second image reading controller 33 controls recording of an image by the second recording unit 40.

The first and second recording units 39, 40 include a recording medium, such as a semiconductor memory. The first recording unit 39 is used for a motion image and the second recording unit 40 is used for a still image. However, one memory area may be divided and shared. The monitor 41 includes a liquid crystal display configured to display an image that is being captured.

A description will now be given of an operation of a control system in the third image pickup mode.

When the motion image pickup is instructed from the motion image instructor 42, the controller 34 resets information of the light receiving element 23a to 0 via the first image reading controller 32. Thereafter, the light receiving element 23a generates image information through photoelectric conversions for a predetermined time period, and the first image reader 30 starts reading the motion image, and stores the read image information in the first memory 37. When the readout ends, the controller 34 resets information of the light receiving element 23a to 0. Next, the first image processor 35 performs image processing containing a tone correction and a color correction, and when the image processing ends, the image is recorded in the first recording unit 39. Thereafter, the controller 34 waits for the next instruction.

When the next instruction is the instruction of the still image pickup from the still image pickup instructor 43, the controller 34 makes the second image reader 31 read the still image via the second image reading controller 33. In other words, the light receiving element 23b generates image information through photoelectric conversions for a predetermined time period, and the second image reader 31 reads a still image from the light receiving element 23b and stores the read image information in the second memory 38. When the readout ends, the controller 34 resets information of the light receiving element 23b to 0. Next, the second image processor 36 performs image processing containing a tone correction and a color correction, and when the image processing ends, the image is recorded in the second recording unit 40. The controller 34 resets the information of the light receiving element 23b before receiving the instruction of the still image pickup.

On the other hand, when the next instruction is the instruction of stopping the motion image pickup from the motion image pickup instructor 42, the controller 34 stops reading the motion image by the first image reader 30 via the first image reading controller 32 and stops recording the image in the first recording unit 39. Thus, the control by the first image reading controller 32 continues until the controller 34 receives the instruction of stopping the motion image pickup from the motion image pickup instructor 42, and does not stop even when the controller 34 receives the instruction of the still image pickup from the still image pickup instructor 43. Therefore, the still image can be captured without interrupting the motion image pickup.

Second Embodiment

Figure 4:
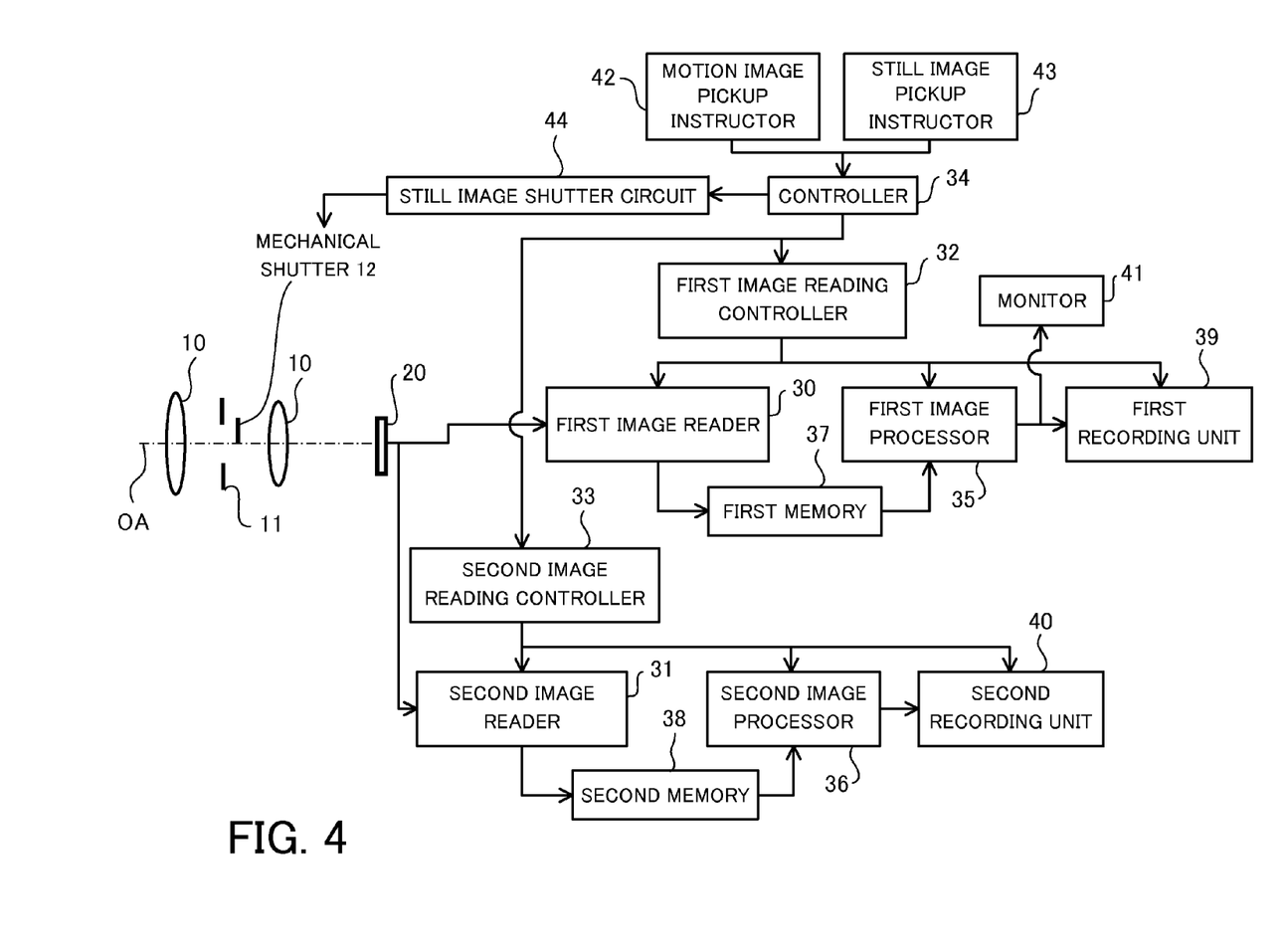
FIG. 4 is a block diagram of an image pickup apparatus according to the second embodiment of the present invention.

FIG. 4 is a block diagram of an image pickup apparatus according to a second embodiment. The image pickup apparatus according to the second embodiment is different from the image pickup apparatus according to the first embodiment in that the image pickup apparatus of the second embodiment includes a mechanical shutter 12 and a still image shutter circuit 44 that acts as a driver of the mechanical shutter 12. The micro lens 22 is arranged on each pixel of the image sensor of this embodiment, as illustrated in FIGS. 2A to 2C, and four light receiving elements are arranged for each micro lens 22 as illustrated in FIG. 3B. Two light receiving elements 23c and 23d receive light that passes part of the pupil of the image pickup optical system 10 and other two light receiving elements 23e and 23f receive light that passes another part of the pupil of the image pickup optical system 10.

The mechanical shutter 12 is arranged near the aperture diaphragm 11 in the image pickup optical system 10, and serves as a still image shutter unit configured to transmit and shield light by mechanically adjusting the size of the aperture of the aperture diaphragm 11. Thereby, the sensitivity can be adjusted.

Figure 5A:
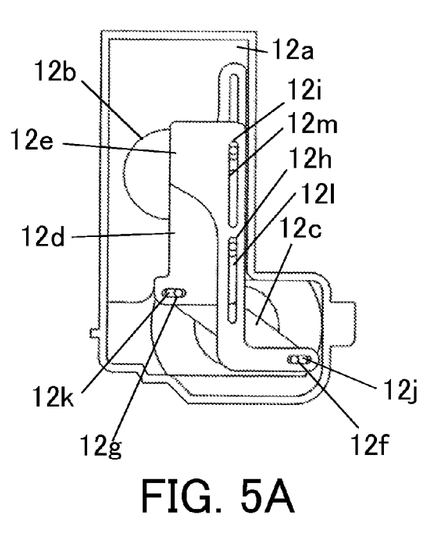
FIGS. 5A and 5B are mechanical shutters illustrated in FIG. 4 according to the second embodiment.
Figure 5B:
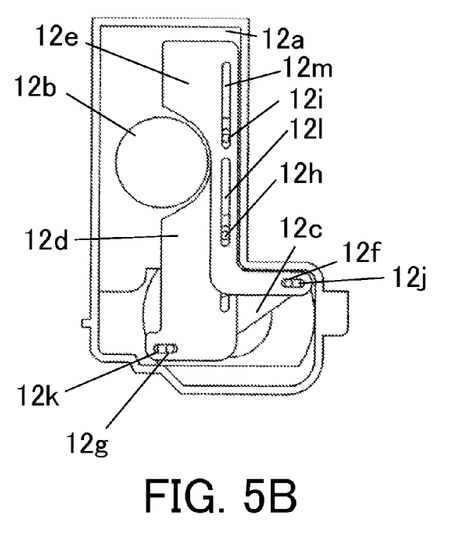

FIGS. 5A and 5B are plane views illustrating a structure of the mechanical shutter 12. FIG. 5A illustrates that a half of the aperture 12b is closed, and FIG. 5B illustrates that the aperture 12b is fully opened.

As illustrated in FIGS. 5A and 5B, the mechanical shutter 12 includes a shutter driving lever 12c and shutter blades 12d and 12e connected to a shutter base plate 12a. The shutter base plate 12a has an opening 12b at a position corresponding to the aperture diaphragm 11 of the image pickup optical system 10. The shutter base plate 12a is provided with two slide stopper pins 12h and 12i. The shutter driving lever 12c is provided with two transmission pins 12f and 12g.

As the still image shutter circuit 44 rotates a motor (not illustrated), the rotations of the two transmission pins 12f and 12g of the shutter driving lever 12c coupled with the motor are transmitted to the shutter blades 12d and 12e. The two transmission pins 12f and 12g rotate together with the shutter driving lever 12c.

The shutter blades 12d and 12e have movement transmission grooves 12j and 12k configured to convert the rotations of the transmission pins 12f and 12g into movements in the sliding direction and to absorb movements in the direction orthogonal to the sliding direction. The shutter blades 12d and 12e have sliding grooves 12l and 12m that are movable in the sliding direction but their movements are restricted by the slide stopper pins 12h and 12i. Thereby, as the shutter driving lever 12c rotates, the shutter blades 12d and 12e slide in opposite directions on the plane perpendicular to the optical axis, and the opening 12b is opened and closed.

Figure 6:
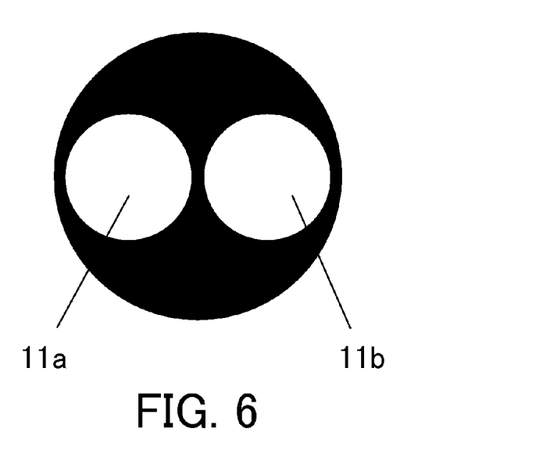
FIG. 6 is a plane view of an illustrative aperture diaphragm illustrated in FIG. 4 according to the second embodiment.

The opening and closing time period of the opening 12b may vary at least between one second and 1/1000 seconds so as to provide a slow shutter to a high-speed shutter. The opening and closing time period of the opening 12b may vary from ten seconds and 1/10000 seconds for the extended photographic latitude. The shape of the aperture diaphragm 11 may have two circular openings 11a and 11b, as illustrated in FIG. 6.

This embodiment is different from the first embodiment in the operation of the second image reading controller 33. Initially, the controller 34 closes the mechanical shutter 12 in advance, and resets information of the light receiving elements 23e and 23f to 0. When the controller 34 receives an instruction of the still image pickup from the still image pickup instructor 43 after the motion image pickup starts, the controller 34 opens the mechanical shutter 12 for a predetermined time period and then closes it, and instructs the second image reader 31 to read out the still image via the second image reading controller 33. In other words, the light receiving elements 23e and 23f generate image information through photoelectric conversions for a predetermined time period, the second image reader 31 reads out the still image from the light receiving elements 23e and 23f, and the second memory 38 stores the read image information. When the readout ends, the controller 34 resets information of the light receiving elements 23e and 23f to 0. Next, the second image processor 36 performs image processing containing a tone correction and a color correction, and when the image processing ends, the image is recorded in the second recording unit 40.

The mechanical shutter 12 may be opened at the image pickup time, and closed when the instruction of the still image pickup is issued. A description will be given of an operation of the second image reading controller 33. Initially, the controller 34 previously opens the mechanical shutter 12. When receiving the instruction of the still image pickup from the still image pickup instructor 43 after the motion image pickup starts, the controller 34 closes the mechanical shutter 12 and resets the information of the light receiving elements 23e and 23f. Next, the controller 34 opens the mechanical shutter 12 for a predetermined time period and then closes it, and instructs the second image reader 31 to read out the still image via the second image reading controller 33. In other words, the light receiving elements 23e and 23f generate image information through photoelectric conversions for a predetermined time period, the second image reader 31 reads out the still image from the light receiving elements 23e and 23f, and the second memory 38 stores the read image information. When the readout ends, the controller 34 resets information of the light receiving elements 23e and 23f to 0. Next, the second image processor 36 performs image processing containing a tone correction and a color correction, and when the image processing ends, the image is recorded in the second recording unit 40.

Figure 7A:
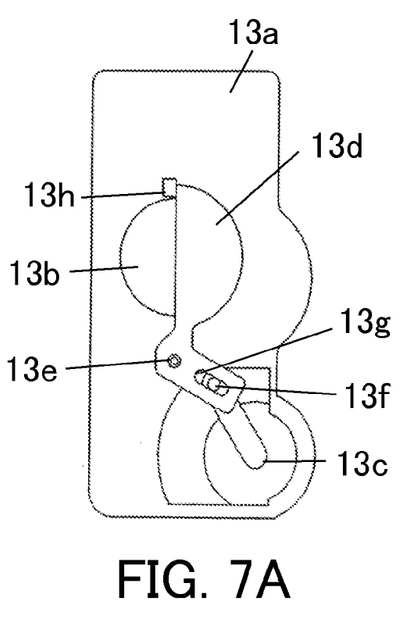
FIGS. 7A and 7B are plane views of a variation of the mechanical shutter illustrated in FIG. 4 according to the second embodiment.
Figure 7B:
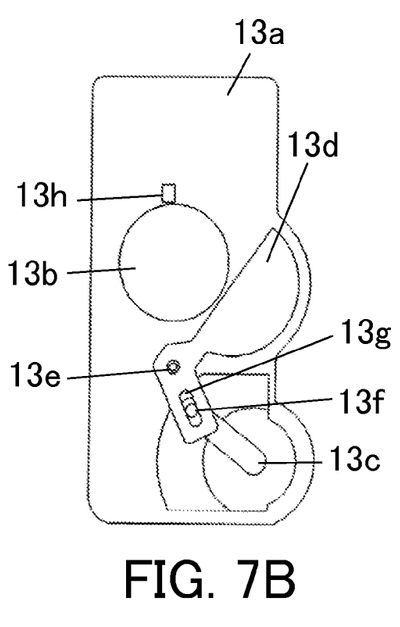

FIGS. 7A and 7B are plane views of a structure of a mechanical shutter 13 usable instead of the mechanical shutter 12. FIG. 7A illustrates that a half of an opening 13b is closed, and FIG. 7B illustrates that the opening 13b is fully opened.

The mechanical shutter 13 includes a shutter driving lever 13c and a shutter blade 13d as a light shielding plate on a shutter base plate 13a. The shutter base plate 13a has an opening 13b at a position corresponding to the aperture diaphragm 11 of the image pickup optical system 10. The shutter base plate 13a is provided with a fulcrum pin 13e, and the shutter driving lever 13c has a transmission pin 13f.

The shutter blade 13d is rotatably connected around the fulcrum pin 13e. The shutter blade 13d has a movement transmission groove 13g configured to transmit the rotations of the transmission pin 13f and to convert it into the rotation of the semicircular shutter blade 13d around the fulcrum pin 13e. Thereby, the shutter blade 13d rotates around the fulcrum pin 13e, and opens and closes the opening 13b. The shutter base plate 13a has a stopper 13h that restricts a position of the shutter blade 13d in the rotational direction.

In FIG. 3B, the motion image information is obtained from the two light receiving elements 23c and 23d, and still image information is obtained from the two light receiving elements 23e and 23f. Alternatively, the motion image information may be received from three light receiving elements 23c to 23e, and the still image information may be received from one light receiving element 23f. In this case, the shutter blade 13d may have a shape that shields light corresponding to a quarter of the aperture diaphragm 11. In other words, a ratio of the light shielding area by the still image shutter unit (or sensitivity) is determined by the ratio of the number of light receiving elements for a still image to the number of all light receiving elements on each micro lens 22.

Third Embodiment

Figure 8:
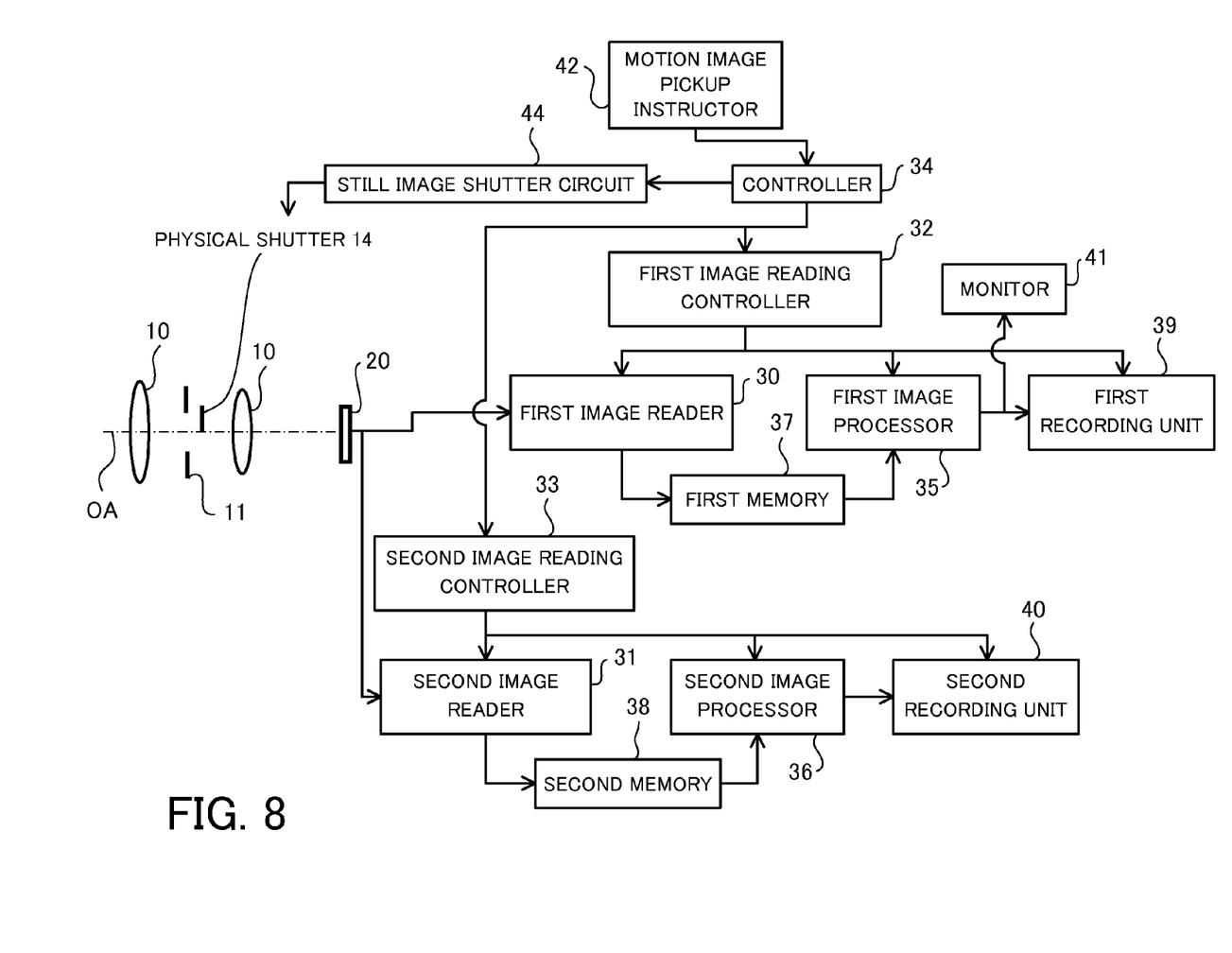
FIG. 8 is a block diagram of an image pickup apparatus according to the third embodiment of the present invention.

FIG. 8 is a block diagram of an image pickup apparatus according to a third embodiment. The image pickup apparatus according to the third embodiment uses a physical-property shutter 14 instead of the mechanical shutter 12 and does not use the still image pickup instructor 43. Other than that, the image pickup apparatus of this embodiment has a structure similar to that of the second embodiment.

Figure 9:
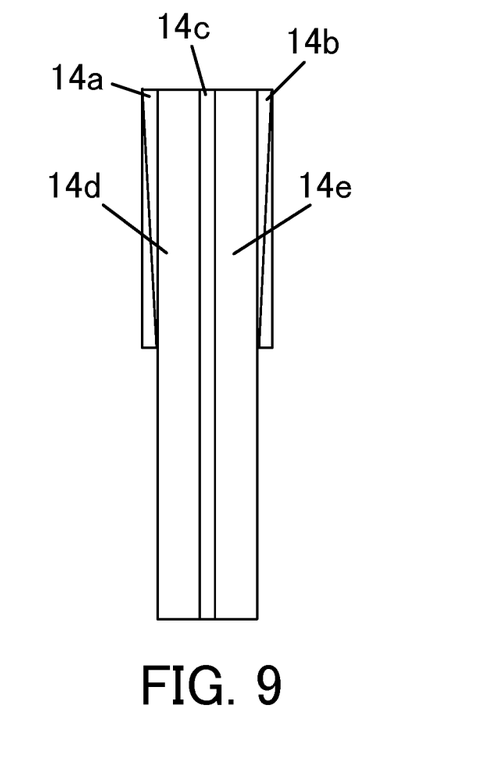
FIG. 9 is an enlarged side view of a physical-property shutter illustrated in FIG. 8 according to the third embodiment.

FIG. 9 is an enlarged side view of the physical-property shutter 14. The physical-property shutter 14 is electrically controlled and configured to switch the half area of the opening 12b between a light transmitting state and a light-shielding state. The physical-property shutter 14 is arranged near the aperture diaphragm 11 of the image pickup optical system 10.

As illustrated in FIG. 9, the physical-property shutter 14 includes, in order from the light incident side, a polarization plate 14a, a transparent substrate 14d, a medium 14c, a transparent substrate 14e, and a polarization plate 14b. The medium 14c can change a polarization direction, made, for example, of TN liquid crystal, and is enclosed between the transparent substrates 14d and 14e. The transparent substrates 14d and 14e are held between the polarization plates 14a and 14b. A transparent electrode (not illustrated) is provided onto each of the transparent substrates 14d and 14e so as to electrically change a state of the medium by an electricity application to the transparent electrodes, and the light polarization direction from the polarization plate 14a is rotated by approximately 90°.

Such a physical-property shutter may be provided only for the half of the opening 12b, but the polarization plates 14a and 14b are provided onto the half of the area of the opening 12b and a transparent area that transmits the light is provided onto the other half of the area of the opening 12b in FIG. 9 in order to equalize each optical path length of the image pickup optical system 10.

In FIG. 8, the light transmitting directions of the polarization plates 14a and 14b are orthogonal to each other. The polarization rotates by 90° so as to provide a light transmitting state when the voltage is not applied, and the polarization becomes 0° so as to provide a light-shielding state when the voltage is applied. The transmittance of each of the polarization plates 14a and 14b in the light transmitting axis direction (or the transmittance of the non-polarized light) may be higher than 30% so as to enhance the utilization efficiency of the light, and the transmittance in the light-shielding state may be less than 0.1% so as to sufficiently express black of an image.

The light transmitting direction may be equal between the polarization plates 14a and 14b. At this time, the relationship between the light transmitting state and the light-shielding state is inverted. A range of the opening and closing speeds is similar to that of the second embodiment. As a physical-property shutter that further improves the transmittance, an electrochromic ("EC") material may be used so as to electrically change a composition of the material and a color between the light transmitting state and the light-shielding state.

According to this embodiment, a photographer does not intentionally issue an instruction of the still image pickup, but the controller 34 automatically reads out the still image at preset intervals. The operation of the first image reading controller 32 is similar to that of the first embodiment. The operation of the second image reading controller 33 is different from that of the first embodiment.

Initially, the controller 34 previously sets the light-shielding state to the physical-property shutter 14, and rests the information of the light receiving elements 23e and 23f to 0. After the motion image pickup starts, the controller 34 sets the light transmitting state to the physical-property shutter 14 and then the light-shielding state to it, instructs the second image reader 31 to read out the still image via the second image reading controller 33. In other words, the light receiving elements 23e and 23f generate image information through photoelectric conversions for a predetermined time period, the second image reader 31 reads out the still image from the light receiving elements 23e and 23f, and the second memory 38 stores read image information. When the readout ends, the controller 34 resets information of the light receiving elements 23e and 23f to 0. Next, the second image processor 36 performs image processing containing a tone correction and a color correction, and when the image processing ends, the image is recorded in the second recording unit 40.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the above embodiments, the micro lens 22 corresponds to one pixel, and a plurality of light receiving elements divide and obtain information of one pixel. Thus, the light receiving element for a still image does not reduce the number of pixels and the resolution of the motion image pickup does not lower.

This application claims the benefit of Japanese Patent Application No. 2012-033496, filed Feb. 20, 2012, which is hereby incorporated by reference herein in its entirety.

What is claimed is:

1. An image pickup apparatus comprising:
   an image sensor that includes a plurality of first photoelectric conversion elements, and a plurality of second photoelectric conversion elements;
   a plurality of micro lenses each of which is provided for each pixel on the image sensor; and
   a controller configured to execute still image pickup using the plurality of second photoelectric conversion elements simultaneous with motion image pickup using the plurality of first photoelectric conversion elements,
   wherein each micro lens introduces a light flux from part of an exit pupil of the image pickup optical system to at least one first photoelectric conversion element, and a light flux from another part of the exit pupil to at least one second photoelectric conversion element.

2. The image pickup apparatus according to claim 1, wherein each micro lens maintains each of the first and second photoelectric conversion elements optically conjugate with the exit pupil.

3. The image pickup apparatus according to claim 1, further comprising an still image shutter unit configured to control a photoelectric conversion time period of the plurality of second photoelectric conversion elements.

4. The image pickup apparatus according to claim 3, wherein the still image shutter unit is an electronic shutter configured to provide a signal used to output an electric charge stored in the plurality of second photoelectric conversion elements.

5. The image pickup apparatus according to claim 3, wherein the still image shutter unit is configured to transmit and shield light that passes the image pickup optical system.

6. The image pickup apparatus according to claim 5, wherein a light shielding ratio by the still image shutter unit corresponds to a ratio of the number of second photoelectric conversion elements to the number of all photoelectric conversion elements of each micro lens.

7. The image pickup apparatus according to claim 1, further comprising a still image pickup instructor into which an instruction of the still image pickup is input,
   wherein the controller captures a still image when the instruction of the still image pickup is input into the still image pickup instructor.

8. The image pickup apparatus according to claim 1, wherein the controller automatically captures a still image at preset intervals.

9. The image pickup apparatus according to claim 1, further comprising a motion image pickup instructor into which an instruction of starting the motion image pickup and an instruction of stopping the motion image pickup are input,
   wherein the controller starts the motion image pickup when the instruction of starting the motion image pickup is input into the motion image pickup instructor, and continues to the motion image pickup until the instruction of stopping the motion image pickup is input into the motion image pickup instructor irrespective of whether or not the still image pickup is performed.

* * * * *